United States Patent
Tanabe

[15] 3,647,375
[45] Mar. 7, 1972

[54] METHOD OF PRODUCING MANGANESE DIOXIDE
[72] Inventor: Isao Tanabe, Tokyo, Japan
[73] Assignee: Japan Metals and Chemicals Company Limited, Tokyo, Japan
[22] Filed: Oct. 22, 1969
[21] Appl. No.: 868,644

[52] U.S. Cl. ..................................................23/145
[51] Int. Cl. ..........................................C01g 45/02
[58] Field of Search ........................................23/145

[56] References Cited
UNITED STATES PATENTS
1,275,666  8/1918  Ellis et al. ..................................23/145

Primary Examiner—Earl C. Thomas
Assistant Examiner—Hoke S. Miller
Attorney—McGlew and Toren

[57] ABSTRACT

A method of producing manganese dioxide comprising the steps of pouring an aqueous solution of a soluble manganese salt and an aqueous solution of alkali carbonate into a reaction vessel and mixing the two solutions so that the two solutions may react with each other to produce manganese carbonate, heating the manganese carbonate produced in an atmosphere containing water vapor to produce crude manganese dioxide, and washing the crude manganese dioxide produced with dilute or concentrated nitric acid and then heating to produce manganese dioxide.

3 Claims, No Drawings

METHOD OF PRODUCING MANGANESE DIOXIDE

The present invention relates to methods of producing manganese dioxide. More particularly, the invention deals with a method of producing manganese dioxide of high quality and high efficiency which has particular utility in application in dry cells.

Manganese dioxide is used as a depolarizer for dry cells. In one method of producing manganese dioxide known in the art, an aqueous solution of a soluble manganese salt is produced from manganese ores by extraction with acid and purification. An alkali carbonate is added to said aqueous solution to produce manganese carbonate which is then subjected to pyrolysis and oxidation to produce crude manganese dioxide from which a divalent oxide of manganese is removed with concentrated sulfuric acid, with the manganese dioxide being activated at the same time. The manganese dioxide produced by this method is generally referred to as chemical manganese. Such a process is described in U.S. Pat. No. 1,275,666.

The manganese dioxide produced by the conventional method described above has a disadvantage when it is used with dry cells. The manganese dioxide produced by this method is in fine particle form. This reduces the amount of charge of manganese dioxide filled in the cells for a unit capacity of the cells, so that the dry cells using the manganese dioxide produced by the conventional method have a short service life.

The present invention obviates the aforementioned disadvantage of manganese dioxide produced by the conventional method described above. Accordingly, the invention has as its object the provision of a method of producing manganese dioxide of high quality which is adapted for use with dry cells to fill the cells with a charge of manganese bicarbonate of high density.

The present invention provides a method of producing manganese dioxide which is characterized by comprising the steps of (1) preparing an aqueous solution of a soluble manganese salt by extraction and purification from manganese ores and preparing an aqueous solution of alkali carbonate which is in a range of proportion of $Na_2CO_3:NaHCO_3$ of 6:4 to 0:10 or $(NH_4)_2CO_3:NH_4HCO_3$ of 9.6:0.4 to 0:10, said two aqueous solutions being poured separately and simultaneously into a reaction vessel in amounts in which the proportion of said aqueous solution of a soluble manganese salt and said aqueous solution of alkali carbonate is in a range from 1:0.9 to 1:1.2 in chemical equivalent and gradually mixed by agitation at a crystal precipitation temperature ranging from room temperature to 90° C. so that the two aqueous solutions may react with each other to produce crude particles of manganese carbonate having a high rate of charge density which are rather spherical in shape; (2) heating the manganese carbonate produced by the preceding step to 280° to 400° C. in an atmosphere containing 10 to 80 percent by volume of water vapor or at 300° to 450° C. in atmosphere air to produce crude manganese dioxide; and (3) causing the crude manganese dioxide produced by the preceding step to be impregnated with dilute or concentrated nitric acid in an amount which is 0.5 to 1.5 time as much as the divalent manganese equivalent contained in said crude manganese dioxide, heating the same at a temperature ranging from 40° C. to the boiling point temperature of nitric acid, and heating again to 160° to 300° C. to produce manganese dioxide, or treating with sulfuric acid crude manganese dioxide produced by the preceding step to produce manganese dioxide. The method of producing manganese dioxide provided by this invention which comprises the aforementioned three steps is capable of producing manganese dioxide of high $MnO_2$ content, a high rate of charge density, and good discharge characteristics which is suitable for use with dry cells.

The steps of the method described above according to this invention will now be explained in detail.

The aqueous solution of a soluble manganese salt used as a starting material is generally an aqueous solution of manganese sulfate produced by extraction with sulfuric acid and purification from manganese carbonate ores or reduced and roasted manganese ores. An aqueous solution of manganese nitrate or manganese chloride may be used. It is only by using an aqueous solution of alkali carbonate which is in a range of proportion of $Na_2CO_3:NaHCO_3$ of 6:4 to 0:10 or $(NH_4)_2CO_3:NH_4HCO_3$ of 9.6:0.4 to 0:10 that manganese carbonate having a high rate of charge density can be produced. It is only by processing the manganese carbonate produced as aforementioned by the following step that manganese dioxide of interest which has a high rate of charge density can be produced. More specifically, the use of alkali carbonate of the aforementioned composition permits the production of large and roundish crystals of manganese dioxide of a diameter in a range from 40 to 100 microns. The manganese dioxide produced as aforementioned has an apparent rate of charge density of 1.6 to 2.1 g./cc. (the apparent rate of charge density refers to a rate at which about 10 cubic centimeters of the dried sample is poured into a measuring cylinder with a capacity of 10 cubic centimeters and filling the same in said measuring cylinder by lightly tapping the bottom of the cylinder on a wooden plate). On the other hand, if an aqueous solution of alkali carbonate of another composition than the aforementioned composition is used, the manganese dioxide produced is in small, square and irregular crystal form and has a diameter of several microns or 30 microns in the maximum, no matter how its concentration, temperature and rate of pouring may be changed. The manganese dioxide of such poor quality only has a low rate of apparent charge density of 0.8 to 1.3 g./cc.

When the aqueous solution of alkali carbonate according to this invention is used, the same results can be achieved by replacing sodium bicarbonate and ammonium bicarbonate with each other in part or wholly. For example, the aforementioned optimum range of proportion is still effective when a mixture of sodium carbonate and ammonium bicarbonate is used.

The reason why the temperature for causing precipitation of manganese carbonate is limited to a range from room temperature to 90° C. in the present invention is that it is possible to produce crystals of manganese carbonate of a high rate of apparent charge density ranging from 1.6 to 2.1 g./cc. if this temperature range is used for causing precipitation, but that the crystals produced by heating to a temperature above 90° C. have a low rate of charge dentity of 1.0 to 1.3 g./cc. If the temperature for causing precipitation is below room temperature, then it is required to effect cooling and this is uneconomical. Moreover, the crystals produced at a temperature below room temperature have a rather low rate of charge density.

The reason why the range of proportion of an aqueous solution of a soluble manganese salt and an aqueous solution of alkali carbonate in the mixture is set at 1:0.9 to 1:1.2 in chemical equivalent is that the crystals of manganese carbonate produced by using a mixture in this range are sufficiently large in size and have a sufficiently high rate of charge density. However, if the proportion of the two aqueous solutions is below 1:0.9 or above 1:1.2, then the crystals of manganese carbonate produced are square in shape and small in size and have a low rate of apparent charge density. From the point of view of reducing production costs, the proportion of the two aqueous solutions is preferably 1:1.

Another important feature of the method of this invention is that an aqueous solution of a soluble manganese salt and an aqueous solution of alkali carbonate are mixed in a chemically equivalent ratio, by pouring separately and simultaneously into a reaction vessel. It has hitherto been customary to add an aqueous solution of alkali carbonate to an aqueous solution of a soluble manganese salt or to add an aqueous solution of a soluble manganese salt to an aqueous solution of alkali carbonate to cause them to react with each other. However, these methods of the prior art have been unable to produce crystals of a sufficiently high rate of charge density no matter how carefully adjustments of the concentrations of aqueous solutions, rate of pouring and the rate of agitation are effected. It is only be pouring the two aqueous solutions separately and simultaneously into a vessel and agitating the mixture according to the method of this invention that crystals can be made to grow satisfactorily while maintaining the ions of manganese and carbonic acid in the mixture in equilibrium. This feature makes it possible carry the method into practice as a continuous reaction system in which the two aqueous solutions are continuously poured into a reaction vessel while the crystals formed and the mixture are withdrawn from the vessel through its lower end or other suitable portion.

It is necessary to thoroughly agitate the mixture of two solutions in producing manganese carbonate. If the mixture is not agitated at all, then the crystals formed are mostly small in size. Accordingly, the crystals produced have a low rate of charge density and cannot attain the end of this invention.

It has been found that if the rate of formation of crystals by precipitation is set at 5 to 800 grams for 1 liter of the mixture of two aqueous solutions per hour, it is possible to produce manganese carbonate in crystals which are sufficiently large in size and which have a sufficiently high rate of charge density. If the rate of crystal formation is below 5 grams per hour, the process is not economically acceptable because the reaction vessel becomes too large in size as it is designed now. Conversely, if the rate is above 800 grams per hour, it is not possible to make the crystals grow sufficiently large, thereby making it impossible to produce crystals having a high rate of charge density.

To sum up, it is possible to produce manganese carbonate in crystals which are sufficiently large in size and which have a high rate of charge density only when the reaction temperature, the composition of alkali carbonate and the proportion of its components, the proportion of two aqueous solutions in the mixture, and the system of pouring the two aqueous solutions into a vessel meet the conditions which constitute essential requirements of this invention. One characterizing feature of this invention is that it is only by subjecting manganese carbonate having a high rate of charge density to further processing operations that manganese dioxide having a high rate of charge density can be produced.

The operation of producing crude manganese dioxide from manganese carbonate by pyrolysis and oxidation will now be explained. Several processes have hitherto been proposed for effecting pyrolysis and oxidation of manganese carbonate. They include the process of heating manganese carbonate at 300° to 450° C. in atmosphere air, for example. The crude manganese dioxide formed by this process may be added with 5 to 25 percent caustic alkali and heated again to 300° to 450° C. so as thereby to increase the $MnO_2$ content of the product.

In the method of this invention, the aforementioned process of the prior art is used to produce crude manganese dioxide which is further processed to provide manganese dioxide of high quality and high efficiency suitable for use with dry cells. The reason why the temperature at which manganese carbonate is heated in atmosphere air is limited to a range from 300° to 450° C. is set forth hereinafter. When manganese carbonate is heated in atmosphere air, crude manganese dioxide produced by heating at 300° to 450° C. for 7 to 8 hours has a $MnO_2$ content of 60 to 70 percent. Crude manganese dioxide produced by heating at 300° to 450° C. for 9 hours after adding caustic alkali to manganese carbonate has a $MnO_2$ content of about 75 percent. If heating is effected at a temperature below 300° C. or above 450° C., the $MnO_2$ content of crude manganese dioxide produced by heating manganese carbonate for 12 hours consecutively in atmosphere air is less than 40 percent. The $MnO_2$ content is increased only by several percent above this level even if caustic alkali is added to the manganese carbonate under processing and heating is continued for an additional 5 hours. It is not economical to use for further processing the crude manganese dioxide produced by heating at temperatures which are not in the aforementioned optimum range. That is, it requires a high acid consumption when treated with acids in the next operation. Moreover, the manganese dioxide produced as a final product has a low activity and particularly its electomotive force is low and its discharge time is short when used with dry cells. Thus, the temperature at which manganese carbonate is heated in atmosphere air in the method of this invention is limited to 300° to 450° C.

The invention calls for the process of heating manganese carbonate to a range from 280° to 400° C. in an atmosphere containing 10 to 80 percent by volume of water vapor which is a feature characteristic of this invention. It has been found that this process permits the production of manganese dioxide of high quality in a short interval of time. The crude manganese dioxide produced by this process naturally requires a smaller amount of acids in the next operation. In addition, a reactor of smaller capacity can be used. Table 1 presents the results of experiments on $MnO_2$ contents of crude manganese dioxide produced from manganese carbonate by pyrolysis and oxidation by heating in an environment containing water vapor according to this invention and by heating merely in atmosphere air.

The figures in the block in Table 1 refer to the $MnO_2$ contents of crude manganese dioxide produced by heating manganese carbonate at temperatures in the range according to this invention in an atmosphere containing water vapor. It will be seen that it is possible to increase the $MnO_2$ content of manganese dioxide to over 60 percent by heating manganese carbonate for 6 hours if the range of temperature according to this invention is used. If the conditions are carefully adjusted,

TABLE 1

$MnO_2$ contents of crude manganese dioxide

| Heating atmosphere (vol. percent) | 250° C. 6 hrs. later | 280° C. 6 hrs. later | 350° C. 3 hrs. later | 6 hrs. later | 400° C. 6 hrs. later | 450° C 6 hrs. later |
|---|---|---|---|---|---|---|
| Waterless air | 15 | 41 | 64 | 68 | 72 | 58 |
| Air containing 5% water vapor | 17 | 42 | 66 | 69 | 74 | 59 |
| Air containing 10% water vapor | 22 | 44 | 77 | 79 | 77 | 58 |
| Air containing 30% water vapor | 45 | 61 | 79 | 82 | 78 | 45 |
| Air containing 60% water vapor | 48 | 74 | 67 | 74 | 60 | 24 |
| Air containing 80% water vapor | 49 | 77 | 57 | 60 | 50 | 17 |
| Air containing 90% water vapor | 50 | 57 | 47 | 51 | 24 | 12 | it would be possible to increase the $MnO_2$ content of manganese dioxide to nearly 80 percent by heating manganese carbonate for only 3 hours or to over 80 percent by heating manganese carbonate for 6 hours at temperatures in the range according to this invention.

It will be seen from the table that substantially the same results are obtained in $MnO_2$ content when heating is effected in an atmosphere containing less that 10 percent by volume of water vapor and when heating is effected in atmosphere air, the $MnO_2$ content of the manganese dioxide produced in both cases being relatively low. On the other hand, the $MnO_2$ content of manganese dioxide produced by heating in an atmosphere containing over 90 percent by volume of water vapor is markedly reduced. When an atmosphere contains 10 to 80 percent by volume of water vapor, the $MnO_2$ content of manganese dioxide produced by heating at a temperature below 280° C. or above 400° C. is markedly reduced. It is based on the results of experiments listed in Table 1 and discussed in detail hereinabove that the conditions for heating manganese carbonate in an atmosphere containing water vapor are limited to temperatures in a range 280° to 400° C. and 10 to 80 percent by volume of water vapor in the method according to this invention.

The operation of producing manganese dioxide of high quality from crude manganese dioxide will now be explained. This operation involves causing crude manganese dioxide to be impregnated with dilute or concentrated sulfuric acid and heated or causing the same to be impregnated with nitric acid and heated so as thereby to produce manganese dioxide of high $MnO_2$ content.

The crude manganese dioxide produced by the operation described above contains unreacted $MnCO_3$ and MnO in its particles because it is obtained from manganese carbonate by pyrolysis so that its $MnO_2$ content is low. When such manganese dioxide is used with dry cells, its discharge capacity is low. The end of providing manganese dioxide of high discharge capacity and high $MnO_2$ content adapted for use with dry cells can be attained by causing crude manganese dioxide to be impregnated with dilute or concentrated sulfuric acid and heated to effect extraction. The sulfuric acid used in this operation has a range of concentrations from 40 to 80 percent. It has been found that heating of crude manganese dioxide at 50° to 110° C. after causing the same to be impregnated with sulfuric acid of this concentration range markedly increases the discharge capacity of manganese dioxide when used with dry cells. It has also been found that when the concentration of sulfuric acid is below 40 percent or the temperature at which heating is effected is below 50° C., extraction of MnO which does not concern in discharge is not effected satisfactorily, and that when the concentration of sulfuric acid is over 80 percent or the temperature at which heating is effected is over 110° C., the manganese dioxide produced after this processing is made inactive. Thus, the manganese dioxide produced under conditions other than those of the present invention stated above has a small discharge capacity when used with dry cells.

The present invention calls for causing crude manganese dioxide to be impregnated with dilute or concentrated nitric acid in place of being impregnated with dilute or concentrated sulfuric acid. This treatment produced manganese nitrate from divalent manganese. When subjected to pyrolysis, manganese nitrate produces manganese dioxide which fills the pores in the particles of crude manganese dioxide, thereby increasing the apparent density of manganese dioxide. This also eliminates or minimizes divalent manganese in amount which might otherwise be freed by elution. In the operation according to this invention, crude manganese dioxide is caused to be impregnated with dilute or concentrated nitric acid in an amount which is 0.5 to 1.5 times as much as the amount of divalent manganese, preferably 0.8 to 1.0 time as much as the amount of divalent manganese, contained in the crude manganese dioxide. Preferably, the nitric acid used in this operation has a concentration which is in the range from 30 to 98 percent. The use of nitric acid of concentrations outside of this range is not desirable. It has been found that if the concentration of nitric acid is below 30 percent, divalent manganese contained in crude manganese dioxide is introduced into the solution by elution, and that if the concentration is above 98 percent as is the case with fuming nitric acid, $NO_2$ in the nitric acid is lost in the next heating operation. Thus, the use of nitric acid of higher concentration entails a loss of material and higher expenses.

It has been found that when crude manganese dioxide is caused to be impregnated with nitric acid, the maximum amount of a nitric acid solution that can be used with no adverse effect is 35 cubic centimeters per 100 grams of crude manganese dioxide. The use of nitric acid in amounts greater than this maximum amount is not desirable because it causes elution of manganese nitrate formed by reaction, thereby increasing the loss of material.

The reason why limits are set to the amount of nitric acid used is set forth hereinafter. When the amount of nitric acid is less than 0.5 time as much as the amount of divalent manganese in crude manganese dioxide, it is not possible effectively to fill the pores in the particles of crude manganese dioxide with manganese dioxide even if heating is effected in the next following operation. If the amount is increased to over 0.5 time as much as the amount of divalent manganese in crude manganese dioxide, then the apparent density is rapidly increased until the amount reaches a level of 0.8 to 1.0 time as much as the amount of divalent manganese in crude manganese dioxide at which the effect of filling the pores of crude manganese dioxide and thereby increasing its apparent density can be increased to the maximum. The use of nitric acid in amounts above 1.5 time as much as the amount of divalent manganese in crude manganese dioxide is not desirable because additional energy is required in the next following pyrolysis operation and the device used for recovering nitric acid must be increased in scale, so that the use of a larger amount of nitric acid than the upper limit of the range according to this invention is uneconomical. Therefore, the optimum range of the amounts of nitric acid is from 0.5 to 1.5 times as much as the amount of divalent manganese in crude manganese dioxide.

According to the method of the present invention, the crude manganese dioxide impregnated with nitric acid is heated at temperature range from 40° C. to the boiling point temperature of nitric acid in order that the nitric acid taken up by crude manganese dioxide and divalent manganese may fully react with each other and to prevent the local escape of unreacted nitric acid caused by sudden heating in the next pyrolysis operation.

The crude manganese dioxide heated as aforementioned is heated again to 160° to 300° C. by means if a tunnel kiln or other suitable heating furnace. As a result, the manganese nitrate disposed in the pores of crude manganese dioxide undergoes decomposition and the pores are filled with manganese dioxide produced as the result of decomposition of manganese nitrate. Thus, manganese dioxide of high $MnO_2$ content and high apparent density is produced. The reason why the temperature at which heating is effected is limited to the range from 160° to 300° C. is set forth hereinafter. It has been found that if the temperature is below 160° C., the decomposition of manganese nitrate does not take place at all, and that if it is over 300° C., the manganese dioxide produced has poor discharge characteristics. Thus, the optimum range of temperatures at which heating is effected according to this invention is limited to the range from 160° to 300° C.

It should be understood that the manganese dioxide produced by the aforementioned processing operations is, of course, made into a suspension in 30 to 80 percent sulfuric acid, heated, filtered, and then washed with water by the usual process in order to further increase the quality of product and activate it. Moreover, the pH of the manganese dioxide may be adjusted because it contains traces of acid even if it is washed with water, so that the residual acid may be neutralized and a pH buffer may be provided to this manganese dioxide. To attain the end, the manganese dioxide produced is immersed in an aqueous solution of several percents sodium bicarbonate and ammonium chloride. After having its pH adjusted, the manganese dioxide is filtered and dried by heating at a temperature below 100° C. to provide a final product.

The method provided by this invention has been explained in detail. It should be noted that the invention permits the production of manganese dioxide of high apparent density and high $MnO_2$ content without reducing its activity and deteriorating its discharge capacity and other electrical properties. The method according to this invention offers advantages in that costs for chemicals and treatment are reduced and the apparatus required for carrying the method into practice can be made smaller in scale than conventional apparatus.

The examples of carrying the method of this invention into practice will now be described.

EXAMPLE 1

2N-$MnSO_4$ was produced from manganese carbonate by extraction with sulfuric acid refined by removing iron and heavy metals therefrom. $MnSO_4$ and a mixture of $(NH_4)_2CO_3$ and $NH_4HCO_3$ were poured separately and simultaneously into a manganese carbonate precipitation tank at rates of 50 liters per hour and 100 liters per hour from a tank containing 1,500 liters of a solution of 2N-MnSO₄ and a tank containing 3,000 liters of a solution of 0.8N-(NH₄)₂CO₃ and 0.2N-NH₄HCO₃ respectively. Said manganese carbonate precipitation tank, which has a capacity of 2,000 liters and which is provided with two an agitator of 2 HP, was placed below the aforementioned two tanks, with 200 liters of 1N-(NH₄)₂SO₄ adjusted to a pH 7 being placed in the precipitation tank beforehand. The two solutions were poured into the precipitation tank such that they were separately introduced into a large quantity of solution in the tank to be scattered therein and then mixed together without being mixed together instantly after pouring. The positions at which the two solutions are poured into the precipitation tank and the manner of agitating the solutions were adjusted to serve the aforementioned purpose. Manganese carbonate was produced by precipitation after the mixture was allowed to stand in the tank at 30° C. for 20 hours.

In order to maintain the liquid level in the precipitation tank constant, a liquid containing no sediment was taken out constantly from the tank by means of a vacuum filter. Samples of small quantities were taken out at regular intervals and the crystals were dried after washing with water. The MnCO₃ in the liquid after 20 hours had a concentration of 600 grams per liter. The crystals formed had a rate of apparent charge density of 2.04 grams per cubic centimeter. The crystals were roundish in shape, with an average diameter of 70 microns. The manganese carbonate produced as aforementioned was filtered and dried at 90° C.

500 kilograms of the manganese carbonate was placed in an horizontal cylinder 3,000 millimeters in length and 1,000 millimeters in diameter and having a built-in shaft mounting agitation blades and rotating at 10 r.p.m., and air preheated to 320° C. and containing 40 percent by volume of water vapor was introduced into said horizontal cylinder at a rate of 0.35 cubic meters per minute so as to heat the manganese carbonate at 300° to 320° C. for 5 hours. The composition by weight of crude manganese dioxide produced was as follows:

| T-Mn | MnO₂ | MnO | CO₂ |
|------|------|-----|-----|
| 58.1 | 83.6 | 6.8 | 2.3 |

The crude manganese dioxide had a rate of apparent charge density of 1.62 grams per cubic centimeter.

44 parts of 60 percent nitric acid was gradually added to 100 parts of the manganese dioxide of aforementioned composition and they were agitated and mixed to provide wet particles having no liquid phase to all appearance. The particles were allowed to stand at 100° C. for 15 minutes and then heated at 200° C. for 1 hour in an electrically heated tunnel kiln to provide 98 parts of manganese dioxide having a MnO₂ content of 89.2 percent and a rate of apparent charge density of 1.71 grams per cubic centimeter.

The manganese dioxide produced was placed in 100 parts of 48 percent sulfuric acid and agitated while heating at 80° C. for 1 hour so as to produce a suspension of manganese dioxide in sulfuric acid. After being filtered and washed with warm water of 60° C., manganese dioxide was placed in 85 parts of a pH adjusting solution comprising by weight 100 parts of water, 5 parts of sodium bicarbonate and 2 parts of ammonium chloride and agitated while heating at 60° C. for 20 minutes to produce a suspension of manganese dioxide in the pH adjusting solution. Then, manganese dioxide was filtered again and dried at 80° C. for 2 hours. The manganese dioxide produced had a composition which was as follows (by weight):

| T-Mn | MnO₂ | MnO |
|------|------|-----|
| 60.2 | 91.8 | 2.9 |

The manganese dioxide produced as a final product had a very high rate of apparent charge density of 1.74 grams per cubic centimeter. It had substantially the same discharge capacity as the manganese dioxide of the MnO₂ content of 89.2 percent mentioned above when used with dry cells.

EXAMPLE 2

500 kilograms of manganese carbonate produced by the process described with reference to Example 1 were placed in an iron horizontal cylinder of the same dimensions as those used in Example 1 and having a built-in shaft mounting agitation blades, and air preheated to 360° C. was introduced into said horizontal tank at a rate of 0.25 cubic meter per minute so as to heat the manganese carbonate at 340° to 360° C. for 9 hours. The crude manganese dioxide produced had a composition which was as follows (by weight):

| T-Mn | MnO₂ | MnO | CO₂ |
|------|------|-----|-----|
| 59.5 | 76.3 | 14.6 | 2.0 |

The manganese dioxide had an apparent charge density of 1.60 grams per cubic centimeter.

75 parts of 75 percent nitric acid was gradually added to 100 parts of the manganese dioxide of aforementioned composition and they were agitated and mixed to provide wet particles which were heated at 100° C. for 15 minutes and then at 200° C. for 90 minutes to provide 100 parts of manganese dioxide with a MnO₂ content of 86.8 percent and a rate of apparent charge density of 1.66 grams per cubic centimeter.

The manganese dioxide produced was placed in 100 parts of 48 percent sulfuric acid and agitated while heating at 80° C. for 1 hour to produce a suspension of manganese dioxide in sulfuric acid. After being filtered and washed with warm water of 60° C., the manganese dioxide was placed in 90 parts of the same pH adjusting solution as described with reference to example 1 and agitated while heating at 60° C. for 20 minutes to produce a suspension of manganese dioxide in the pH adjusting solution. Then, the manganese dioxide was filtered and dried at 80° C. for 2 hours. The manganese dioxide produced had a composition which was as follows (by weight):

| T-Mn | MnO₂ | MnO |
|------|------|-----|
| 59.9 | 91.2 | 3.0 |

The manganese dioxide produced as a final product had a very high rate of charge density of 1.71 grams per cubic centimeter. It had substantially the same discharge capacity as the manganese dioxide of example 1 when used with dry cells.

EXAMPLE 3

100 parts of crude manganese dioxide produced by the process described with reference to Example 1 and having the composition shown therein was placed in 90 parts of 60 percent sulfuric acid and agitated while heating at 70° C. for 1 hour to provide a suspension of manganese dioxide in sulfuric acid. After being filtered and washed with warm water of 60° C., the manganese dioxide was placed in the same pH adjusting solution as used in Example 1 and agitated while heating at 60° C. for 20 minutes to provide a suspension of manganese dioxide in the pH adjusting solution. Then, manganese dioxide was filtered again and dried at 80° C. for 2 hours. The manganese dioxide produced had a composition which was as follows (by weight):

| T-Mn | MnO₂ | MnO |
|------|------|-----|
| 60.1 | 90.7 | 3.6 |

The manganese dioxide produced as a final product had a rate of apparent charge density of 1.69 grams per cubic centimeter. It had substantially the same discharge capacity as the manganese dioxide produced by the process described with reference to Example 1 when used with dry cells.

What is claimed is:
1. A method of producing manganese dioxide comprising the steps of
   a. pouring an aqueous solution of a soluble manganese salt and an aqueous solution of alkali carbonate separately and simultaneously into a reaction vessel and gradually mixing the two solutions by agitating at a crystal precipitation temperature ranging from room temperature to 90° C. so that the two solutions may react with each to produce manganese carbonate, said aqueous solution of alkali carbonate being selected from the group consisting of (1) sodium carbonate and sodium bicar- bonate in a range of proportion of 6:4 to 0:10 and (2) ammonium carbonate and ammonium bicarbonate in a range of proportion of 9.6:0.4 to 0:10;
b. heating the manganese carbonate produced by the preceding step to 280° to 400° C. in an atmosphere containing 10 to 80 percent by volume of water vapor to produce crude manganese dioxide having an apparent rate of charge density of above 1.6 grams per cubic centimeter; and
c. causing the crude manganese dioxide produced by the preceding step to be impregnated with dilute or concentrated nitric acid in an amount which is 0.5 to 1.5 times as much as the divalent manganese contained in said crude manganese dioxide, heating the crude manganese dioxide impregnated with nitric acid at a temperature range from 40° C. to the boiling point temperature of nitric acid, followed by further heating to a range from 160° to 300° C. to produce manganese dioxide.

2. A method of producing manganese dioxide which comprises the steps of
a. pouring an aqueous solution of a soluble manganese salt and an aqueous solution of alkali carbonate separately and simultaneously into a reaction vessel and gradually mixing the two solutions by agitating at a crystal precipitation temperature ranging from room temperature to 90° C. so that the two solutions may react with each other to produce manganese carbonate, said aqueous solution of alkali carbonate being selected from the group consisting of (1) sodium carbonate and sodium bicarbonate in a range of proportion of 6:4 to 0:10 and (2) ammonium carbonate and ammonium bicarbonate in a range of proportion of 9.6:0.4 to 0:10;
b. heating the manganese carbonate produced by the preceding step to 300° to 450° C. in atmosphere air after adding an aqueous solution of an alkali such as caustic soda, caustic potash or the like to produce crude manganese dioxide having an apparent rate of charge density of above 1.6 grams per cubic centimeter; and
c. Causing the crude manganese dioxide produced by the preceding step to be impregnated with dilute or concentrated nitric acid in an amount which is 0.5 to 1.5 times as much as the divalent manganese contained in said crude manganese dioxide, heating the crude manganese dioxide impregnated with nitric acid at a temperature range from 40° C. to the boiling point temperature of nitric acid, followed by further heating to a range from 160° to 300° C. to produce manganese dioxide.

3. A method of producing manganese dioxide comprising the steps of
a. pouring an aqueous solution of a soluble manganese salt and an aqueous solution of alkali carbonate separately and simultaneously into a reaction vessel and gradually mixing the two solutions by agitating at a crystal precipitation temperature ranging from room temperature to 90° C. so that the two solutions may react with each other to produce manganese carbonate, said aqueous solution of alkali carbonate being selected from the group consisting of (1) sodium carbonate and sodium bicarbonate in a range of proportion of 6:4 to 0:10 and (2) ammonium carbonate and ammonium bicarbonate in a range of proportion of 9.6:0.4 to 0:10;
b. heating the manganese carbonate produced by the preceding step to a range from 280° to 400° C. in an atmosphere containing 10 to 80 percent by volume of water vapor to produce crude manganese dioxide having an apparent rate of charge density of above 1.6 grams per cubic centimeter; and
c. Adding 40 to 80 percent concentrated sulfuric acid to the crude manganese dioxide produced by the preceding step and heating the crude manganese dioxide to 50° to 110° C. so as thereby to remove divalent manganese by elution, thus producing manganese dioxide of high $MnO_2$ content.

* * * * *